(12) United States Patent
Xu et al.

(10) Patent No.: US 12,732,988 B2
(45) Date of Patent: Sep. 8, 2026

(54) UPLINK SKIPPING

(71) Applicant: Apple Inc., Cupertino, CA (US)

(72) Inventors: Fangli Xu, Beijing (CN); Dawei Zhang, Saratoga, CA (US); Haijing Hu, Los Gatos, CA (US); Sigen Ye, San Diego, CA (US); Sarma V Vangala, Campbell, CA (US); Murtaza A Shikari, Mountain View, CA (US); Srinivasan Nimmala, San Jose, CA (US); Ralf Rossbach, Munich (DE)

(73) Assignee: Apple Inc., Cupertino, CA (US)

( * ) Notice: Subject to any disclaimer, the term of this patent is extended or adjusted under 35 U.S.C. 154(b) by 322 days.

(21) Appl. No.: 18/261,353

(22) PCT Filed: May 26, 2021

(86) PCT No.: PCT/CN2021/096071

§ 371 (c)(1),
(2) Date: Jul. 13, 2023

(87) PCT Pub. No.: WO2022/151630

PCT Pub. Date: Jul. 21, 2022

(65) Prior Publication Data

US 2024/0080834 A1 Mar. 7, 2024

(30) Foreign Application Priority Data

Jan. 15, 2021 (WO) ................ PCT/CN2021/072073

(51) Int. Cl.
*H04W 72/1263* (2023.01)
*H04W 72/21* (2023.01)

(52) U.S. Cl.
CPC ....... *H04W 72/1263* (2013.01); *H04W 72/21* (2023.01)

(58) Field of Classification Search
None
See application file for complete search history.

(56) References Cited

U.S. PATENT DOCUMENTS 10,785,793 B2 9/2020 Sun et al.
2018/0220440 A1 8/2018 Dudda et al.
2018/0227960 A1 8/2018 Belghoul et al.
2020/0053749 A1 * 2/2020 Liu ....................... H04W 72/23
2020/0260478 A1 8/2020 Yang et al.

FOREIGN PATENT DOCUMENTS

CN 111800802 10/2020
WO 2019/137116 7/2019

* cited by examiner

*Primary Examiner* — Kouroush Mohebbi
(74) *Attorney, Agent, or Firm* — Fay Kaplun & Marcin, LLP

(57) ABSTRACT

Embodiments of the present disclosure relate to devices, methods, apparatuses and computer readable storage media for prioritizing data transmissions. According to embodiments of the present disclosure, in accordance with a determination that there is an overlap between a configured uplink grant and a dynamic uplink grant, a terminal device selects, from the configured uplink grant and the dynamic uplink grant, a target uplink grant for transmitting data to a network device. Thereby, the terminal device transmits data to the network device via the target uplink grant.

16 Claims, 13 Drawing Sheets

200

210
IN ACCORDANCE WITH A DETERMINATION THAT THERE IS AN OVERLAP BETWEEN A CONFIGURED UPLINK GRANT AND A DYNAMIC UPLINK GRANT, SELECT, FROM THE CONFIGURED UPLINK GRANT AND THE DYNAMIC UPLINK GRANT, A TARGET UPLINK GRANT FOR TRANSMITTING DATA TO A NETWORK DEVICE

220
TRANSMIT DATA TO THE NETWORK DEVICE VIA THE TARGET UPLINK GRANT

UPLINK SKIPPING

TECHNICAL FIELD

Embodiments of the present disclosure generally relate to the field of telecommunications, and in particular, to a method, device, apparatus and computer program product for uplink (UL) skipping.

BACKGROUND

In current wireless networks, uplink transmissions are based on uplink grants. A network device may allocate resources to a terminal device for uplink transmissions. For example, the network device may transmit an uplink grant indicating the allocated time and frequency resources to the terminal device. Thereby, the terminal device may transmit data to the network device using the allocated time and frequency resources. There are two types of uplink grants: configured uplink grant and dynamic uplink grant. The configured uplink grant is transmitted by the network device at a predetermined interval. In contrast, the dynamic uplink grant is dynamically transmitted by the network device as needed. However, the configured uplink grant may overlap with the dynamic uplink grant.

SUMMARY

In general, example embodiments of the present disclosure provide a method, device, apparatus and computer program product for uplink skipping.

In a first aspect, there is provided a method. The method comprises in accordance with a determination that there is an overlap between a configured uplink grant and a dynamic uplink grant, selecting, at a terminal device and from the configured uplink grant and the dynamic uplink grant, a target uplink grant for transmitting data to a network device; and transmitting data to the network device via the target uplink grant.

In a second aspect, there is provided a terminal device. The terminal device comprises at least one processor and at least one memory including computer program codes. The at least one memory and the computer program codes are configured to, with the at least one processor, cause the terminal device to, in accordance with a determination that there is an overlap between a configured uplink grant and a dynamic uplink grant, select, from the configured uplink grant and the dynamic uplink grant, a target uplink grant for transmitting data to a network device; and transmit data to the network device via the target uplink grant.

In a third aspect, there is provided a baseband processor of a terminal device configured to perform the method according to the above first aspect of the present disclosure.

In a fourth aspect, there is provided a computer readable storage medium comprising program instructions stored thereon. The instructions, when executed by an apparatus, cause the apparatus to perform the method according to the above first aspect.

In a fifth aspect, there is provided a computer program product that is stored on a computer readable medium and includes machine-executable instructions. The machine-executable instructions, when being executed, cause a machine to perform the method according to the above first aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
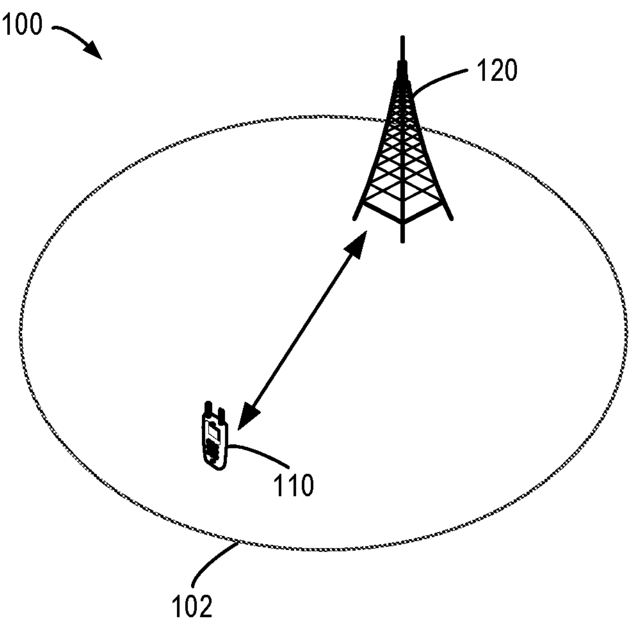
FIG. 1 shows an example communication network in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific tee ins used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay node, a low power node such as a femto, a pico, and so forth, depending on the applied terminology and technology. An example of the relay node may be an Integrated Access and Backhaul (IAB) node. A distributed unit (DU) part of the IAB node may perform the functionalities of "network device" and thus can operate as the network device. In the following description, the terms "network device", "BS", and "node" may be used interchangeably.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over II' (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a relay node, a device operating on commercial and/or industrial wireless networks, and the like. A Mobile Termination (MT) part of the IAB node may perform the functionalities of "terminal device" and thus can operate as the terminal device. In the following description, the terms "terminal device", "communication device", "terminal", "user equipment" and "UE" may be used interchangeably.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IOT device or fixed JOT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

As briefly discussed above, the configured uplink grant may overlap with the dynamic uplink grant. The physical uplink share channel (PUSCH) duration of the configured uplink grant may overlap with the PUSCH duration of the dynamic uplink grant, such as, an uplink grant received in a Random Access Response (RAR) for the serving cell or an uplink grant received on physical downlink control channel (PDCCH). However, in traditional schemes, the terminal device will always select the dynamic uplink grant for uplink transmission and drop the configured uplink grant regardless of whether there is available data for transmission via the dynamic uplink grant or not. For instance, if there is no available data for transmission via the dynamic uplink grant, the terminal device will not transmit any data. In this event, even if there is data for transmission via the configured uplink grant, such data will be dropped. Thus, the transmission efficiency is degraded.

Alternatively, if there is no available data for transmission via the dynamic uplink grant, the terminal device will also transmit the uplink control information (UCI) via the dynamic uplink grant, but still drop the data for transmission via the configured uplink grant. In this case, the transmission efficiency is poor due to transmitting padding instead of the available data.

Exemplary embodiments of the present disclosure propose a solution for uplink skipping, so as to solve the above problems and one or more of other potential problems. In some exemplary embodiments, if there is an overlap between a configured uplink grant and a dynamic uplink grant, a terminal device may select, from the configured uplink grant and the dynamic uplink grant, a target uplink grant for transmitting data to a network device. Thereby, the terminal device may transmit data to the network device via the target uplink grant. In this way, the terminal device can flexibly choose the desired uplink grant for data transmission, and thus improve the transmission efficiency.

Principles and implementations of the present disclosure will be described in detail below with reference to the accompanying drawings.

FIG. 1 shows an example communication network 100 in which example embodiments of the present disclosure can be implemented. The communication network 100 includes a terminal device 110 and a network device 120 serving the terminal device 110. The terminal device 110 and the network device 120 can communicate with each other. The serving area of the network device 120 is called as a cell 102. It is to be understood that the number of terminal devices, network devices and cells is only for the purpose of illustration without suggesting any limitations. The communication network 100 may include any suitable number of terminal devices, network devices and cells adapted for implementing embodiments of the present disclosure. Furthermore, the functionalities of the network device 120 can be split into multiple network nodes, such as Transmission and Reception Points (TRPs), centralized unit (CU) and DU, etc. Although not shown, it would be appreciated that a plurality of terminal devices may be located in the cell 102 and served by the network device 120.

Communications in the communication network 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

In the network 100, the terminal device 110 and the network device 120 can communicate data and control information to each other. A link from the network device 120 to the terminal device 110 is referred to as a downlink (DL), while a link from the terminal device 110 to the network device 120 is referred to as an uplink (UL).

Figure 2:
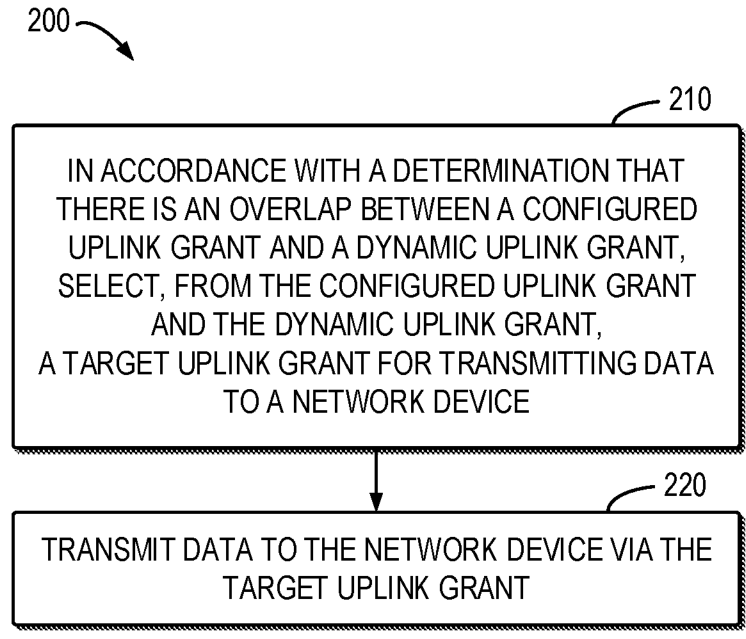
FIG. 2 illustrates a flowchart of an example method of selecting a target uplink grant according to some example embodiments of the present disclosure.

FIG. 2 shows a flowchart of an example method 200 of selecting a target uplink grant in accordance with some example embodiments of the present disclosure. The method 200 can be implemented at the terminal device 110 shown in FIG. 1. It is to be understood that the method 200 may include additional blocks not shown and/or may omit some shown blocks, and the scope of the present disclosure is not limited in this regard.

At block 210, if there is an overlap between a configured uplink grant and a dynamic uplink grant, the terminal device 110 selects, from the configured uplink grant and the dynamic uplink grant, a target uplink grant for transmitting data to the network device 120. As discussed above, the configured uplink grant indicates the resource allocated the terminal device 110 and is transmitted by the network device 120 at a predetermined interval. The dynamic uplink grant also indicates the resource allocated the terminal device 110 but is dynamically transmitted by the network device 120 as needed. For example, the dynamic uplink grant may be an uplink grant received on PDCCH, or an uplink grant received in a RAR.

In some cases, the configured uplink grant may overlap with the dynamic uplink grant. In this event, the PUSCH duration of the configured uplink grant may overlap with the PUSCH duration of the dynamic uplink grant. When the overlapping occurs, the terminal device 110 may select an uplink grant for data transmission. In some embodiments, the terminal device 110 may always select the dynamic uplink grant as the target uplink grant regardless of whether the data (interchangeably referred to as "first data") transmitted via the dynamic uplink grant is available or not.

Alternatively, the terminal device 110 may select the target uplink grant based on the data available for transmitting. For example, if there is data (interchangeably referred to as "second data") for transmission via the configured uplink grant, but no data for transmission via the dynamic uplink grant, the configured uplink grant can be selected as the target uplink grant. In other scenarios, the dynamic uplink grant can be selected as the target uplink grant.

Specifically, in some embodiments, if there is second data for transmission via the configured uplink grant, the terminal device 110 may select the configured uplink grant as the target uplink grant. In other embodiments, if there is first data for transmission via the dynamic uplink grant, the terminal device 110 may select the dynamic uplink grant as the target uplink grant. In further embodiments, if there is first data for transmission via the dynamic uplink grant and there is second data for transmission via the configured uplink grant, the terminal device 110 may select the dynamic uplink grant as the target uplink grant. In this way, the terminal device can flexibly choose the desired uplink grant for transmitting data, and thus improve the transmission efficiency.

At block 220, the terminal device 110 transmits data to the network device 120 via the target uplink grant. The data to be transmitted may depend on the selection of the target uplink grant.

For example, in the case of always selecting the dynamic uplink grant as the target uplink grant, the data transmission may have the following conditions. In one condition, if there is first data for transmission via the dynamic uplink grant, the terminal device 110 may transmit the first data and uplink control information to the network device 120 via the target uplink grant. In a further condition, if there is no available data for transmission via the dynamic uplink grant and there is second data for transmission via the configured uplink grant, the terminal device 110 may transmit the second data and uplink control information to the network device 120 via the target uplink grant.

In another condition, if there is first data for transmission via the dynamic uplink grant and there is second data for transmission via the configured uplink grant, the terminal device 110 may transmit the first data and uplink control information to the network device 120 via the target uplink grant without transmitting the second data to the network device. In yet another condition, if there is first data for transmission via the dynamic uplink grant and there is second data for transmission via the configured uplink grant, the terminal device 110 may transmit the first data, the second data and uplink control information to the network device 120 via the target uplink grant.

In addition, in the case of selecting the target uplink grant based on the data available for transmitting, the data transmission may have the following conditions. In one condition, when there is second data for transmission via the configured uplink grant, and the configured uplink grant is selected as the target uplink grant, the terminal device 110 may transmit the second data to the network device 120 via the target uplink grant without transmitting uplink control information to the network device 120, or transmit the second data and the uplink control information to the network device 120 via the target uplink grant.

In another condition, when there is first data for transmission via the dynamic uplink grant, and the dynamic uplink grant is selected as the target uplink grant, the terminal device 110 may transmit the first data and uplink control information to the network device 120 via the target uplink grant.

In a further condition, when there is first data for transmission via the dynamic uplink grant and there is second data for transmission via the configured uplink grant, and the dynamic uplink grant is selected as the target uplink grant, the terminal device 110 may transmit the first data and uplink control information to the network device 120 via the target uplink grant, or transmit the first data, the second data and uplink control information to the network device 120 via the target uplink grant.

The examples of data transmission in the case of always selecting the dynamic uplink grant as the target uplink grant will be described in more detail below with reference to FIGS. 3-6. In addition, the examples of data transmission in the case of selecting the target uplink grant based on the data available for transmitting will be described in more detail below with reference to FIGS. 7-11.

Figure 3:
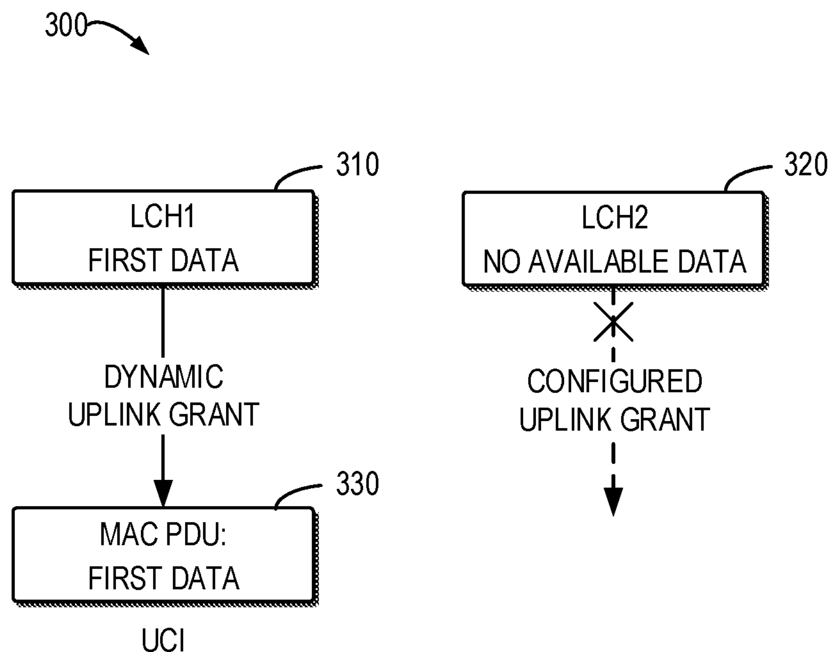
FIG. 3 illustrates a schematic diagram of a first uplink transmission according to some example embodiments of the present disclosure.

FIG. 3 illustrates a schematic diagram of a first uplink transmission 300 according to some example embodiments of the present disclosure. In FIG. 3, there is first data for transmission via the dynamic uplink grant. In this case, the terminal device 110 transmits the first data and uplink control information to the network device 120 via the target uplink grant, i.e. the dynamic uplink grant.

Specifically, as shown in FIG. 3, the first data 310 of the logical channel (LCH) 1 is configured to be mapped on the dynamic uplink grant. In this case, the first data 310 is configured to be transmitted via the dynamic uplink grant. In addition, the logical channel 2 has no available data 320 to be transmitted via the configured uplink grant.

In such case, the terminal device 110 assembles, in the media access control (MAC) layer, the MAC protocol data unit (PDU) 330 to carry the first data 310. Thereby, the terminal device 110 transmits the MAC PDU 330 to the physical (PHY) layer. In the PHY layer, the terminal device 110 carries the uplink control information via the dynamic uplink grant. In this case, the terminal device 110 may transmit the first data and uplink control information to the network device 120 via the dynamic uplink grant.

Figure 4:
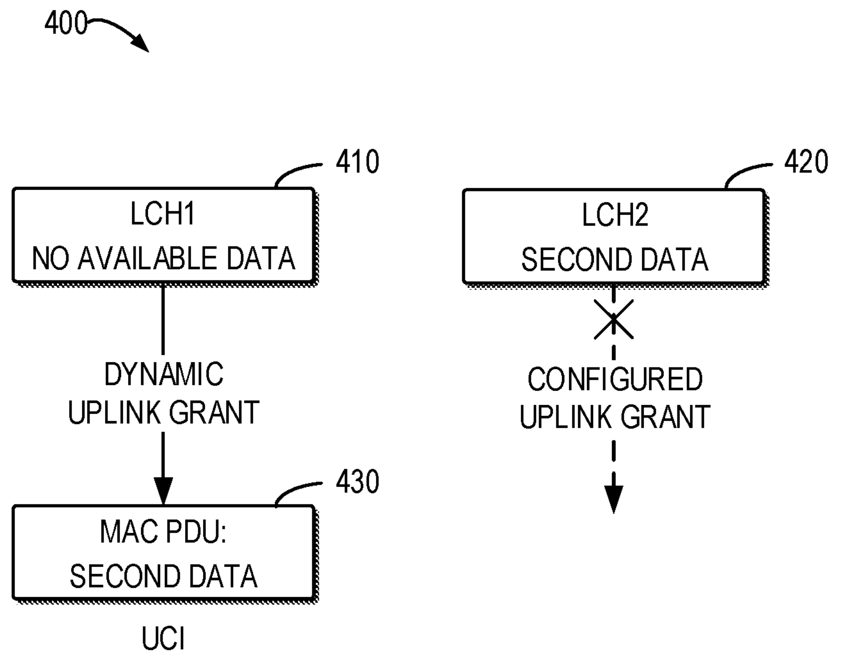
FIG. 4 illustrates a schematic diagram of a second uplink transmission according to some example embodiments of the present disclosure.

FIG. 4 illustrates a schematic diagram of a second uplink transmission 400 according to some example embodiments of the present disclosure. In FIG. 4, there is no available data for transmission via the dynamic uplink grant, and there is second data for transmission via the configured uplink grant. In this case, the terminal device 110 transmits the second data and uplink control information to the network device 120 via the target uplink grant, i.e. the dynamic uplink grant.

Specifically, as shown in FIG. 4, the logical channel 1 has no available data 410 to be transmitted via the dynamic uplink grant. In addition, the second data 420 of the logical channel 2 is configured to be transmitted via the configured uplink grant.

In such case, the terminal device 110 assembles, in the MAC layer, the MAC PDU 430 to carry the second data 420. Thereby, the terminal device 110 transmits the MAC PDU 430 to the PHY layer. In the PHY layer, the terminal device 110 carries the uplink control information via the dynamic uplink grant. In this case, the terminal device 110 may transmit the second data and uplink control information to the network device 120 via the dynamic uplink grant.

In this way, the resource allocated to the terminal device 110 can be fully utilized to transmit the available data for the configured uplink grant, even if the dynamic uplink grant is selected. Thus, the transmission efficiency can be improved.

Figure 5:
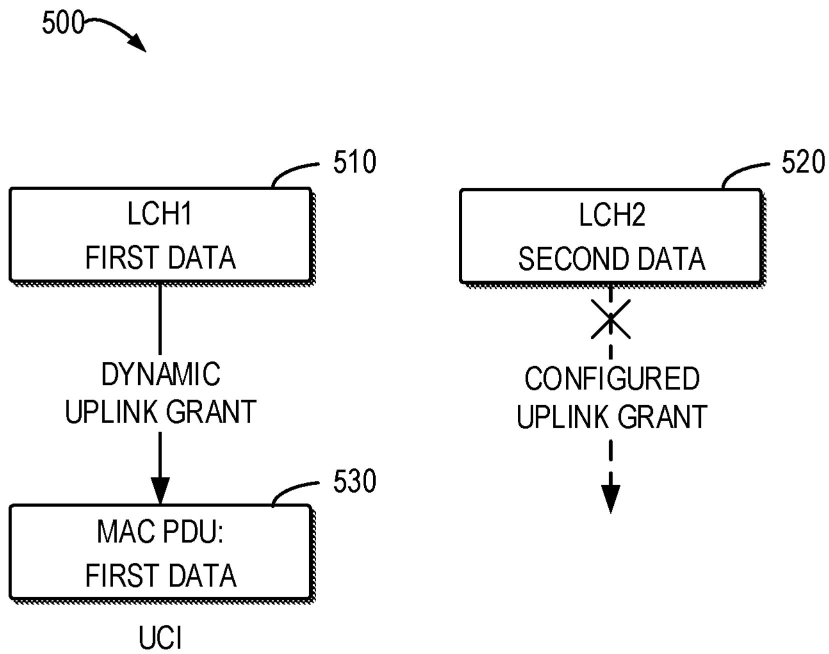
FIG. 5 illustrates a schematic diagram of a third uplink transmission according to some example embodiments of the present disclosure.

FIG. 5 illustrates a schematic diagram of a third uplink transmission 500 according to some example embodiments of the present disclosure. In FIG. 5, there is first data for transmission via the dynamic uplink grant, and there is second data for transmission via the configured uplink grant. In this case, the terminal device 110 transmits the first data and uplink control information to the network device 120 via the target uplink grant, i.e. the dynamic uplink grant.

Specifically, as shown in FIG. 5, the first data 510 of logical channel 1 is configured to be transmitted via the dynamic uplink grant. In addition, the second data 520 of the logical channel 2 is configured to be transmitted via the configured uplink grant.

In such case, the terminal device 110 assembles, in the MAC layer, the MAC PDU 530 to carry the first data 510. Thereby, the terminal device 110 transmits the MAC PDU 530 to the PHY layer. In the PHY layer, the terminal device 110 carries the uplink control information via the dynamic uplink grant. In this case, the terminal device 110 may transmit the first data and uplink control information to the network device 120 via the dynamic uplink grant.

Figure 6:
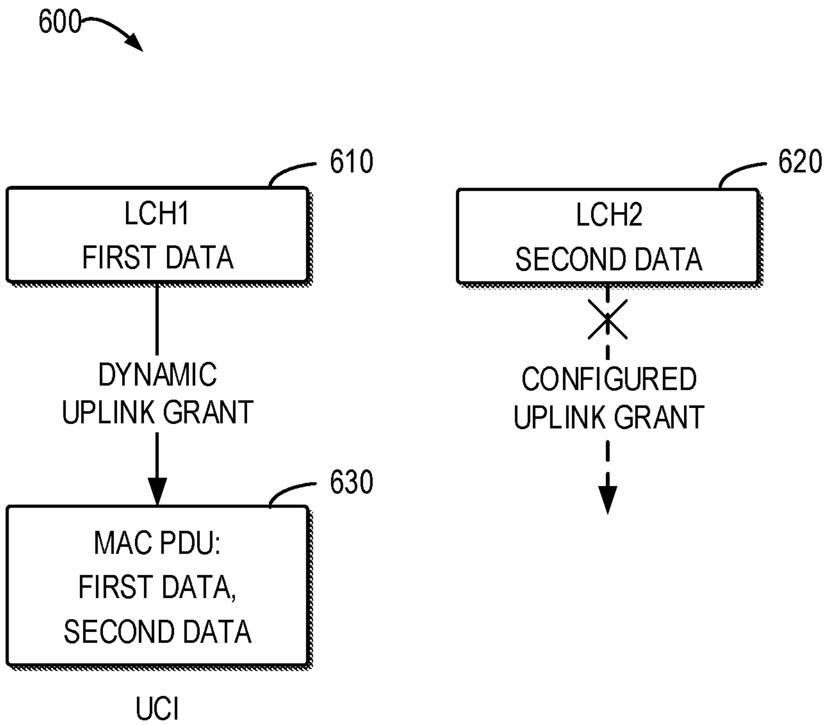
FIG. 6 illustrates a schematic diagram of a fourth uplink transmission according to some example embodiments of the present disclosure.

FIG. 6 illustrates a schematic diagram of a fourth uplink transmission 600 according to some example embodiments of the present disclosure. In FIG. 6, there is first data for transmission via the dynamic uplink grant, and there is second data for transmission via the configured uplink grant. In this case, the terminal device 110 transmits the first data, the second data and uplink control information to the network device 120 via the target uplink grant, i.e. the dynamic uplink grant.

Specifically, as shown in FIG. 6, the first data 610 of the logical channel 1 is configured to be transmitted via the dynamic uplink grant. In addition, the second data 620 of logical channel 2 is configured to be transmitted via the configured uplink grant.

In such case, the terminal device 110 assembles, in the MAC layer, the MAC PDU 630 to carry the first data 610 and the second data 620. Thereby, the terminal device 110 transmits the MAC PDU 630 to the PHY layer. In the PHY layer, the terminal device 110 carries the uplink control information via the dynamic uplink grant. In this case, the terminal device 110 may transmit the first data, the second data and uplink control information to the network device 120 via the dynamic uplink grant.

In this way, the resource allocated to the terminal device 110 can be fully utilized to transmit the available data for the configured uplink grant, even if the dynamic uplink grant is selected. Thus, the transmission efficiency can be improved.

The data transmission in the case of always selecting the dynamic uplink grant as the target uplink grant is described above. The following text will describe the data transmission in the case of selecting the target uplink grant based on the data available for transmitting.

Figure 7:
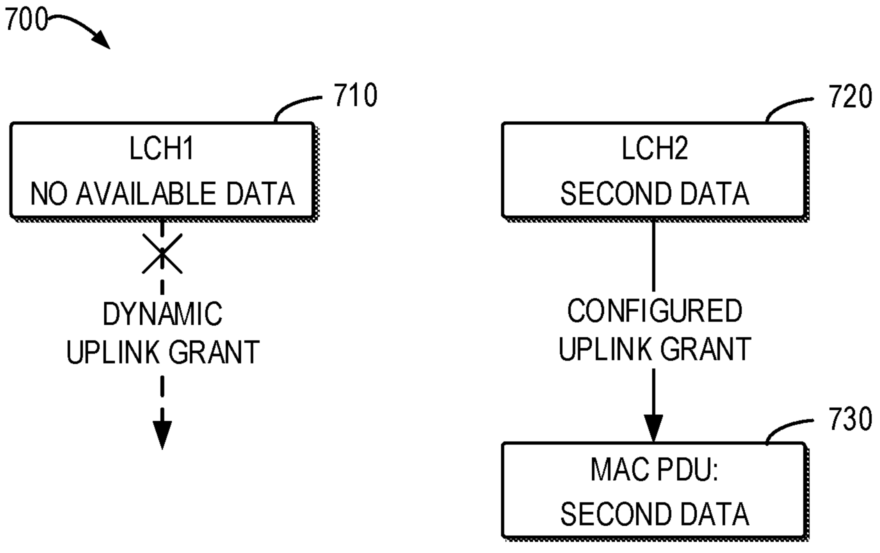
FIG. 7 illustrates a schematic diagram of a fifth uplink transmission according to some example embodiments of the present disclosure.

FIG. 7 illustrates a schematic diagram of a fifth uplink transmission 700 according to some example embodiments of the present disclosure. In FIG. 7, the configured uplink grant is selected as the target uplink grant. In addition, there is no available data for transmission via the dynamic uplink grant, and there is second data for transmission via the configured uplink grant. In this case, the terminal device 110 transmits the second data to the network device 120 via the target uplink grant, i.e. the configured uplink grant, without transmitting uplink control information to the network device 120.

Specifically, as shown in FIG. 7, the logical channel 1 has no available data 710 to be transmitted via the dynamic uplink grant. In addition, the second data 720 of the logical channel 2 is configured to be transmitted via the configured uplink grant.

In such case, the terminal device 110 assembles, in the MAC layer, the MAC PDU 730 to carry the second data 720. Thereby, the terminal device 110 transmits the MAC PDU 730 to the PHY layer. In the PHY layer, the terminal device 110 drops the uplink control information. In this case, the terminal device 110 may transmit the second data 720 to the network device 120 via the configured uplink grant, without transmitting the uplink control information to the network device 120.

In this way, the resource allocated to the terminal device 110 can be fully utilized to transmit the available data for the configured uplink grant. Thus, the transmission efficiency can be improved.

Figure 8:
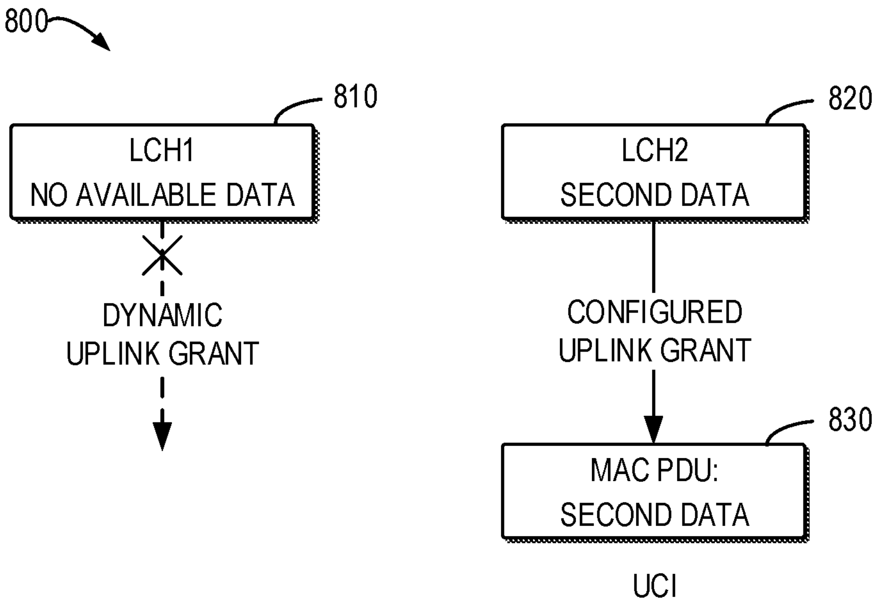
FIG. 8 illustrates a schematic diagram of a sixth uplink transmission according to some example embodiments of the present disclosure.

FIG. 8 illustrates a schematic diagram of a sixth uplink transmission 800 according to some example embodiments of the present disclosure. In FIG. 8, the configured uplink grant is selected as the target uplink grant. In addition, there is no available data for transmission via the dynamic uplink grant, and there is second data for transmission via the configured uplink grant. In this case, the terminal device 110 transmits the second data and the uplink control information to the network device 120 via the target uplink grant, i.e. the configured uplink grant.

Specifically, as shown in FIG. 8, the logical channel 1 has no available data 810 to be transmitted via the dynamic uplink grant. In addition, the second data 820 of the logical channel 2 is configured to be transmitted via the configured uplink grant.

In such case, the terminal device 110 assembles, in the MAC layer, the MAC PDU 830 to carry the second data 820. Thereby, the terminal device 110 transmits the MAC PDU 830 to the PHY layer. In the PHY layer, the terminal device 110 carries the uplink control information via the configured uplink grant. In this case, the terminal device 110 may transmit the second data 820 and the uplink control information to the network device 120 via the configured uplink grant.

In this way, the resource allocated to the terminal device 110 can be fully utilized to transmit the available data for the configured uplink grant, and the uplink control information can also be transmitted via the configured uplink grant. Thus, the transmission efficiency can be improved.

Figure 9:
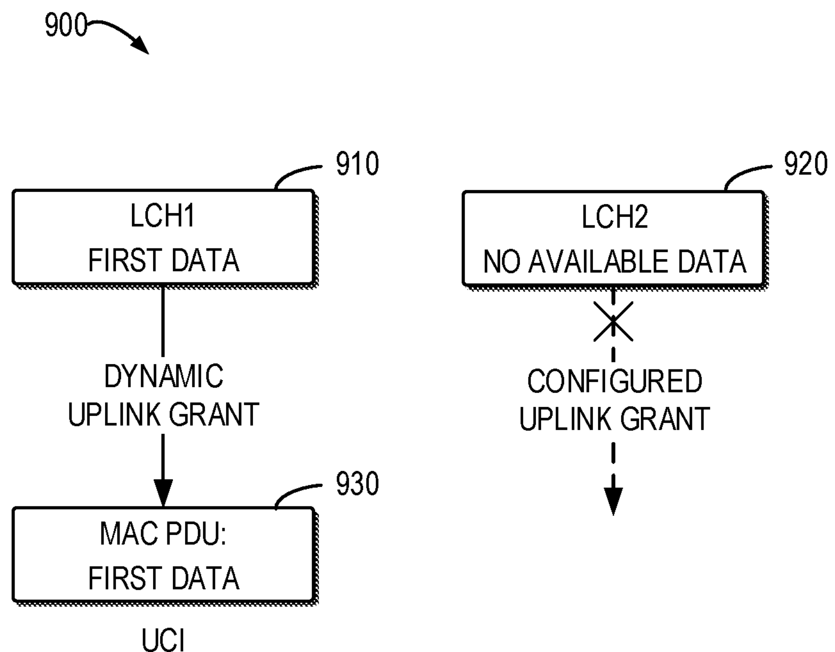
FIG. 9 illustrates a schematic diagram of a seventh uplink transmission according to some example embodiments of the present disclosure.

FIG. 9 illustrates a schematic diagram of a seventh uplink transmission 900 according to some example embodiments of the present disclosure. In FIG. 9, the dynamic uplink grant is selected as the target uplink grant. In addition, there is first data for transmission via the dynamic uplink grant, and there is no available data for transmission via the configured uplink grant. In this case, the terminal device 110 transmits the first data and the uplink control information to the network device 120 via the target uplink grant, i.e. the dynamic uplink grant.

Specifically, as shown in FIG. 9, the first data 910 of the logical channel 1 is configured to be transmitted via the dynamic uplink grant. In addition, the logical channel 2 has no available data 920 to be transmitted via the configured uplink grant.

In such case, the terminal device 110 assembles, in the MAC layer, the MAC PDU 930 to carry the first data 910. Thereby, the terminal device 110 transmits the MAC PDU 930 to the PHY layer. In the PHY layer, the terminal device 110 carries the uplink control information via the dynamic uplink grant. In this case, the terminal device 110 may transmit the first data 910 and the uplink control information to the network device 120 via the dynamic uplink grant.

Figure 10:
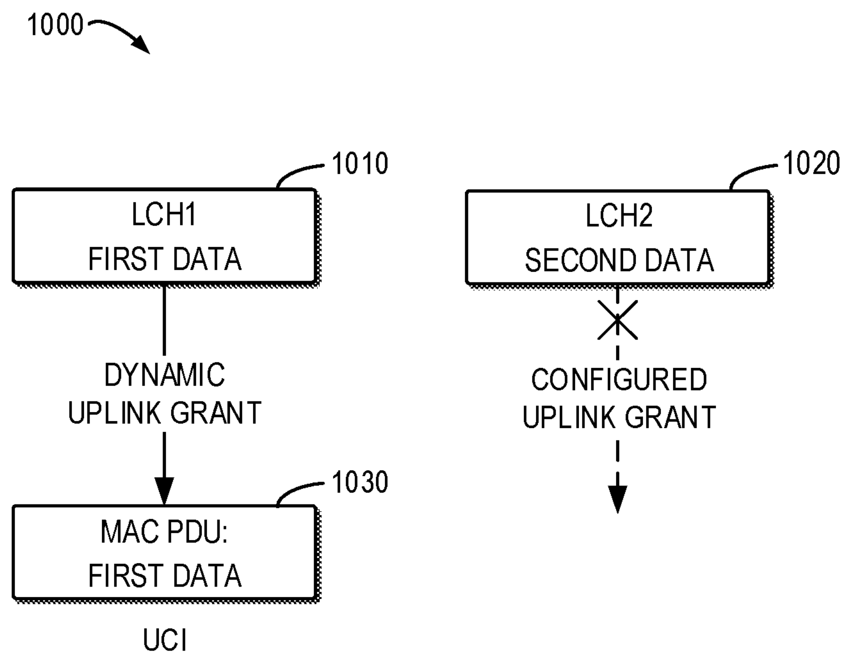
FIG. 10 illustrates a schematic diagram of an eighth uplink transmission according to some example embodiments of the present disclosure.

FIG. 10 illustrates a schematic diagram of an eighth uplink transmission 1000 according to some example embodiments of the present disclosure. In FIG. 10, the dynamic uplink grant is selected as the target uplink grant. In addition, there is first data for transmission via the dynamic uplink grant, and there is second data for transmission via the configured uplink grant. In this case, the terminal device 110 transmits the first data and the uplink control information to the network device 120 via the target uplink grant, i.e. the dynamic uplink grant.

Specifically, as shown in FIG. 10, the first data 1010 of the logical channel 1 is configured to be transmitted via the dynamic uplink grant. In addition, the second data 1020 of the logical channel 2 is configured to be transmitted via the configured uplink grant.

In such case, the terminal device 110 assembles, in the MAC layer, the MAC PDU 1030 to carry the first data 1010. Thereby, the terminal device 110 transmits the MAC PDU 1030 to the PHY layer. In the PHY layer, the terminal device 110 carries the uplink control information via the configured uplink grant. In this case, the terminal device 110 may transmit the first data 1010 and the uplink control information to the network device 120 via the dynamic uplink grant.

Figure 11:
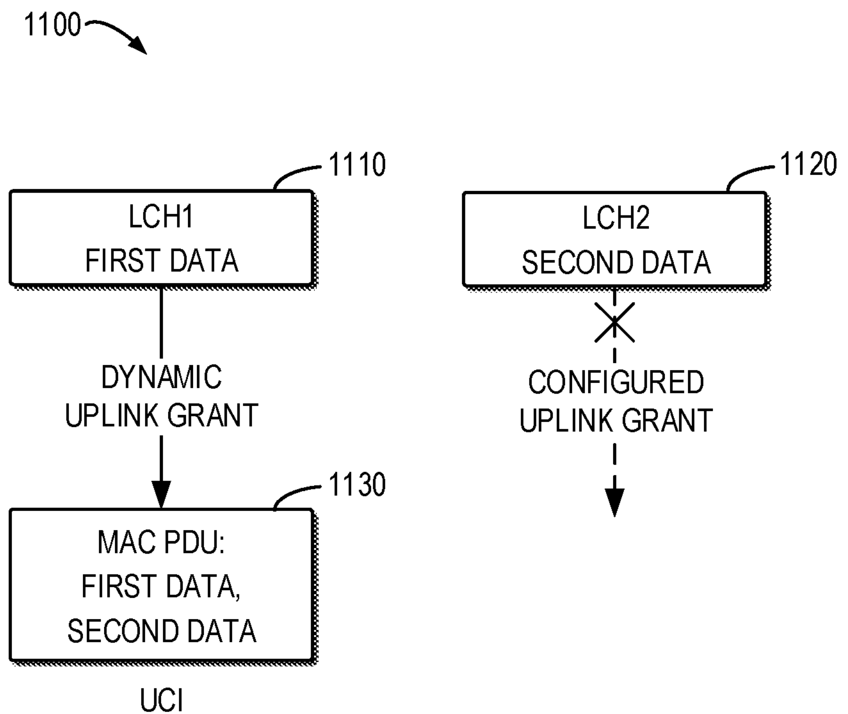
FIG. 11 illustrates a schematic diagram of a ninth uplink transmission according to some example embodiments of the present disclosure.

FIG. 11 illustrates a schematic diagram of a ninth uplink transmission 1100 according to some example embodiments of the present disclosure. In FIG. 11, the dynamic uplink grant is selected as the target uplink grant. In addition, there is first data for transmission via the dynamic uplink grant, and there is second data for transmission via the configured uplink grant. In this case, the terminal device 110 transmits the first data, the second data and the uplink control information to the network device 120 via the target uplink grant, i.e. the dynamic uplink grant.

Specifically, as shown in FIG. 11, the first data 1110 of the logical channel 1 is configured to be transmitted via the dynamic uplink grant. In addition, the second data 1020 of the logical channel 2 is configured to be transmitted via the configured uplink grant.

In such case, the terminal device 110 assembles, in the MAC layer, the MAC PDU 1130 to carry the first data 1110 and the second data 1120. Thereby, the terminal device 110 transmits the MAC PDU 1130 to the PHY layer. In the PITY layer, the terminal device 110 carries the uplink control information via the configured uplink grant. In this case, the terminal device 110 may transmit the first data 1110, the second data 1120 and the uplink control information to the network device 120 via the dynamic uplink grant.

In this way, the resource allocated to the terminal device 110 can be fully utilized to transmit the available data for the configured uplink grant, even if the dynamic uplink grant is selected. Thus, the transmission efficiency can be improved.

In some example embodiments, an apparatus capable of performing the method 200 may comprise means for performing the respective steps of the method 200. The means may be implemented in any suitable form. For example, the means may be implemented in a circuitry or software module.

In some example embodiments, the apparatus capable of performing the method 200 comprises: means for, in accordance with a determination that there is an overlap between a configured uplink grant and a dynamic uplink grant, selecting, from the configured uplink grant and the dynamic uplink grant, a target uplink grant for transmitting data to a network device; and means for transmitting data to the network device via the target uplink grant.

In some example embodiments, the means for selecting a target uplink grant for transmitting data to a network device comprises: means for selecting the dynamic uplink grant as the target uplink grant.

In some example embodiments, the means for transmitting data to the network device via the target uplink grant comprises: means for, in accordance with a determination that there is first data for transmission via the dynamic uplink grant, transmitting the first data and uplink control information to the network device via the target uplink grant.

In some example embodiments, the means for transmitting data to the network device via the target uplink grant comprises: means for, in accordance with a determination that there is no available data for transmission via the dynamic uplink grant and there is second data for transmission via the configured uplink grant, transmitting the second data and uplink control information to the network device via the target uplink grant.

In some example embodiments, the means for transmitting data to the network device via the target uplink grant comprises: means for, in accordance with a determination that there is first data for transmission via the dynamic uplink grant and there is second data for transmission via the configured uplink grant, transmitting the first data and uplink control information to the network device via the target uplink grant.

In some example embodiments, the means for transmitting data to the network device via the target uplink grant comprises: means for, in accordance with a determination that there is first data for transmission via the dynamic uplink grant and there is second data for transmission via the configured uplink grant, transmitting the first data, the second data and uplink control information to the network device via the target uplink grant.

In some example embodiments, the means for selecting a target uplink grant for transmitting data to a network device comprises: means for, in accordance with a determination that there is second data for transmission via the configured uplink grant, selecting the configured uplink grant as the target uplink grant.

In some example embodiments, the means for transmitting data to the network device via the target uplink grant comprises one of the following: means for transmitting the second data to the network device via the target uplink grant without transmitting uplink control information to the network device; or means for transmitting the second data and the uplink control information to the network device via the target uplink grant.

In some example embodiments, the means for selecting a target uplink grant for transmitting data to a network device comprises: means for, in accordance with a determination that there is first data for transmission via the dynamic uplink grant, selecting the dynamic uplink grant as the target uplink grant.

In some example embodiments, the means for transmitting data to the network device via the target uplink grant comprises: means for transmitting the first data and uplink control information to the network device via the target uplink grant.

In some example embodiments, the means for selecting a target uplink grant for transmitting data to a network device comprises: means for, in accordance with a determination that there is first data for transmission via the dynamic uplink grant and there is second data for transmission via the configured uplink grant, selecting the dynamic uplink grant as the target uplink grant.

In some example embodiments, the means for transmitting data to the network device via the target uplink grant comprises: means for transmitting the first data and uplink control information to the network device via the target uplink grant without transmitting the second data to the network device; or means for transmitting the first data, the second data and uplink control information to the network device via the target uplink grant.

Figure 12:
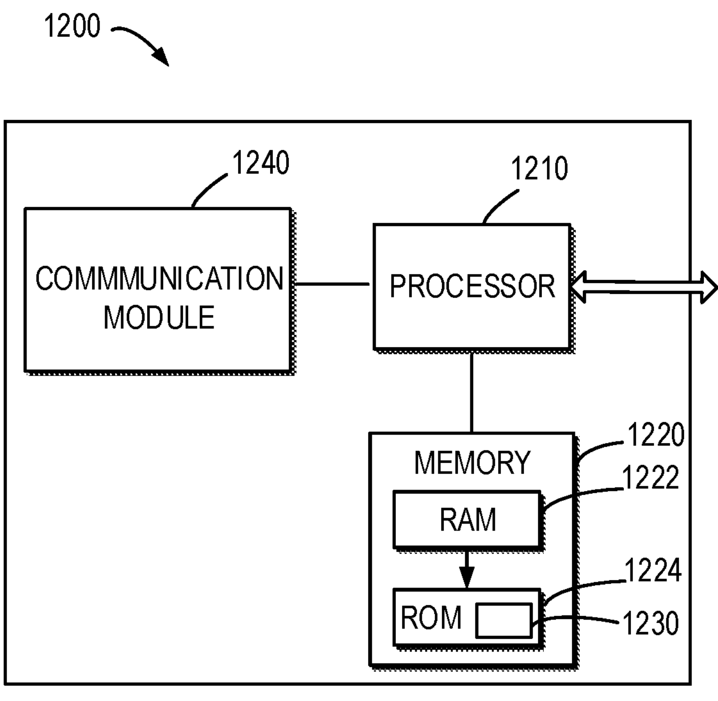
FIG. 12 illustrates a simplified block diagram of a device that is suitable for implementing example embodiments of the present disclosure.

FIG. 12 is a simplified block diagram of a device 1200 that is suitable for implementing embodiments of the present disclosure. For example, the terminal device 110 and/or the network device 120 can be implemented by the device 1200. As shown, the device 1200 includes one or more processors 1210, one or more memories 1220 coupled to the processor 1210, and one or more communication modules 1240 coupled to the processor 1210.

The communication module 1240 is for bidirectional communications. The communication module 1240 has at least one antenna to facilitate communication. The communication interface may represent any interface that is necessary for communication with other network elements.

The processor 1210 may be of any type suitable to the local technical network and may include one or more of the following: general purpose computers, special purpose computers, microprocessors, digital signal processors (DSPs) and processors based on multicore processor architecture, as non-limiting examples. The device 1200 may have multiple processors, such as an application specific integrated circuit chip that is slaved in time to a clock which synchronizes the main processor.

The memory 1220 may include one or more non-volatile memories and one or more volatile memories. Examples of the non-volatile memories include, but are not limited to, a Read Only Memory (ROM) 1224, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1222 and other volatile memories that will not last in the power-down duration.

A computer program 1230 includes computer executable instructions that are executed by the associated processor 1210. The program 1230 may be stored in the ROM 1224. The processor 1210 may perform any suitable actions and processing by loading the program 1230 into the RAM 1222.

The embodiments of the present disclosure may be implemented by means of the program 1230 so that the device 1200 may perform any process of the disclosure as discussed with reference to FIGS. 2-11. The embodiments of the present disclosure may also be implemented by hardware or by a combination of software and hardware.

Figure 13:
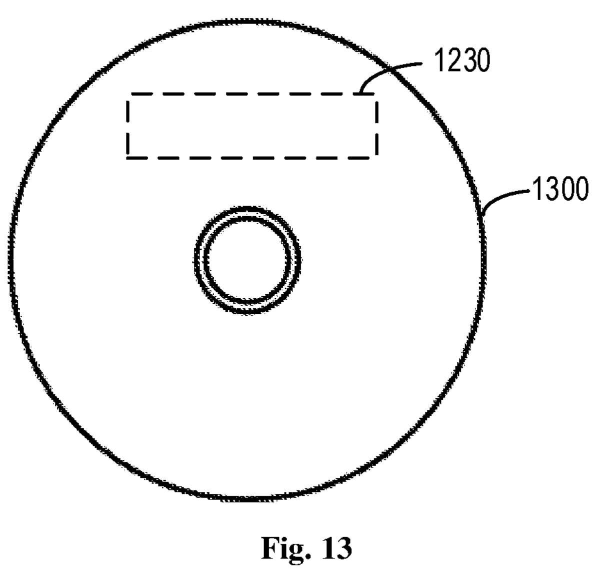
FIG. 13 illustrates a block diagram of an example computer readable medium in accordance with some example embodiments of the present disclosure.

In some example embodiments, the program 1230 may be tangibly contained in a computer readable medium which may be included in the device 1200 (such as in the memory 1220) or other storage devices that are accessible by the device 1200. The device 1200 may load the program 1230 from the computer readable medium to the RAM 1222 for execution. The computer readable medium may include any types of tangible non-volatile storage, such as ROM, EPROM, a flash memory, a hard disk, CD, DVD, and the like. FIG. 13 shows an example of the computer readable medium 1300 in form of CD or DVD. The computer readable medium has the program 1230 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 200 as described above with reference to FIG. 2. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A processor of a terminal device configured to perform operations comprising:

in accordance with a determination that there is an overlap between a configured uplink grant and a dynamic uplink grant, selecting from the configured uplink grant and the dynamic uplink grant, a target uplink grant for transmitting data to a network device;

selecting the dynamic uplink grant as the target uplink grant; and transmitting data to the network device via the target uplink grant, wherein the transmitting data to the network device via the target uplink grant comprises:

in accordance with a determination that there is no available data for transmission via the dynamic uplink grant and there is second data for transmission via the configured uplink grant, transmitting the second data and uplink control information to the network device via the target uplink grant.

2. The processor of claim 1, wherein the transmitting data to the network device via the target uplink grant comprises:

in accordance with a determination that there is first data for transmission via the dynamic uplink grant, transmitting the first data and uplink control information to the network device via the target uplink grant.

3. The processor of claim 1, wherein the transmitting data to the network device via the target uplink grant comprises:

in accordance with a determination that there is first data for transmission via the dynamic uplink grant and there is second data for transmission via the configured uplink grant, transmitting the first data and uplink control information to the network device via the target uplink grant.

4. The processor of claim 1, wherein the transmitting data to the network device via the target uplink grant comprises:

in accordance with a determination that there is first data for transmission via the dynamic uplink grant and there is second data for transmission via the configured uplink grant, transmitting the first data, the second data and uplink control information to the network device via the target uplink grant.

5. The processor of claim 1, wherein the transmitting data to the network device via the target uplink grant comprises:

transmitting data and uplink control information to the network device via the target uplink grant.

6. The processor of claim 1, wherein the transmitting data to the network device via the target uplink grant comprises:

transmitting first data and uplink control information to the network device via the target uplink grant without transmitting second data to the network device.

7. A terminal device comprising:

a processor; and a memory coupled to the processor and storing instructions thereon, the instructions, when executed by the processor, causing the terminal device to:

in accordance with a determination that there is an overlap between a configured uplink grant and a dynamic uplink grant, select, from the configured uplink grant and the dynamic uplink grant, a target uplink grant for transmitting data to a network device;

selecting the dynamic uplink grant as the target uplink grant; and transmit data to the network device via the target uplink grant, wherein the transmitting data to the network device via the target uplink grant comprises:

in accordance with a determination that there is no available data for transmission via the dynamic uplink grant and there is second data for transmission via the configured uplink grant, transmitting the second data and uplink control information to the network device via the target uplink grant.

8. The terminal device of claim 7, wherein the instructions, when executed by the processor, further cause the terminal device to:

in accordance with a determination that there is first data for transmission via the dynamic uplink grant, transmit the first data and uplink control information to the network device via the target uplink grant.

9. The terminal device of claim 7, wherein the instructions, when executed by the processor, further cause the terminal device to:

in accordance with a determination that there is first data for transmission via the dynamic uplink grant and there is second data for transmission via the configured uplink grant, transmit the first data and uplink control information to the network device via the target uplink grant.

10. The terminal device of claim 7, wherein the instructions, when executed by the processor, further cause the terminal device to:

in accordance with a determination that there is first data for transmission via the dynamic uplink grant and there is second data for transmission via the configured uplink grant, transmit the first data, the second data and uplink control information to the network device via the target uplink grant.

11. A method, comprising:

at a terminal device:

determining that there is an overlap between a configured uplink grant and a dynamic uplink grant;

selecting, from the configured uplink grant and the dynamic uplink grant, a target uplink grant for transmitting data to a network device;

selecting the dynamic uplink grant as the target uplink grant; and transmitting data to the network device via the target uplink grant, wherein the transmitting data to the network device via the target uplink grant comprises:

in accordance with a determination that there is no available data for transmission via the dynamic uplink grant and there is second data for transmission via the configured uplink grant, transmitting the second data and uplink control information to the network device via the target uplink grant.

12. The method of claim 11, wherein the transmitting data to the network device via the target uplink grant comprises:

in accordance with a determination that there is first data for transmission via the dynamic uplink grant, transmitting the first data and uplink control information to the network device via the target uplink grant.

13. The method of claim 11, wherein the transmitting data to the network device via the target uplink grant comprises:

in accordance with a determination that there is first data for transmission via the dynamic uplink grant and there is second data for transmission via the configured uplink grant, transmitting the first data and uplink control information to the network device via the target uplink grant.

14. The method of claim 11, wherein the transmitting data to the network device via the target uplink grant comprises:

in accordance with a determination that there is first data for transmission via the dynamic uplink grant and there is second data for transmission via the configured uplink grant, transmitting the first data, the second data and uplink control information to the network device via the target uplink grant.

15. The method of claim 11, wherein the transmitting data to the network device via the target uplink grant comprises:

transmitting data and uplink control information to the network device via the target uplink grant.

16. The method of claim 11, wherein the transmitting data to the network device via the target uplink grant comprises:

transmitting first data and uplink control information to the network device via the target uplink grant without transmitting second data to the network device.

* * * * *